Aug. 29, 1961     A. VEILLET     2,997,812
REINFORCEMENT FOR FERRO-CONCRETE
Filed Feb. 17, 1958     2 Sheets-Sheet 1
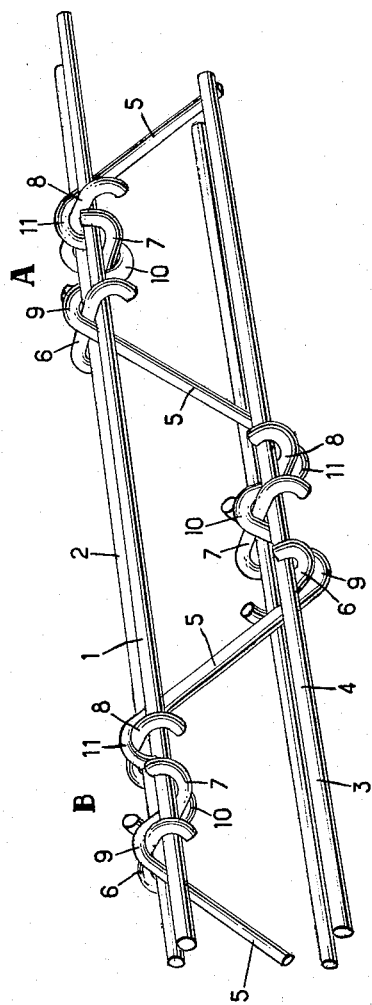
André Veillet
INVENTOR.

Aug. 29, 1961 A. VEILLET 2,997,812
REINFORCEMENT FOR FERRO-CONCRETE
Filed Feb. 17, 1958 2 Sheets-Sheet 2
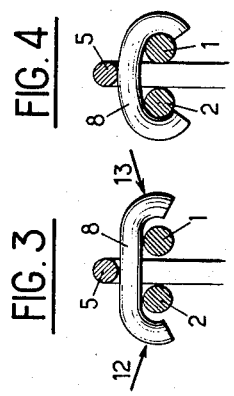
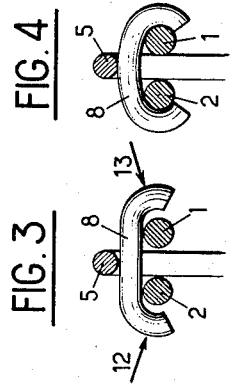
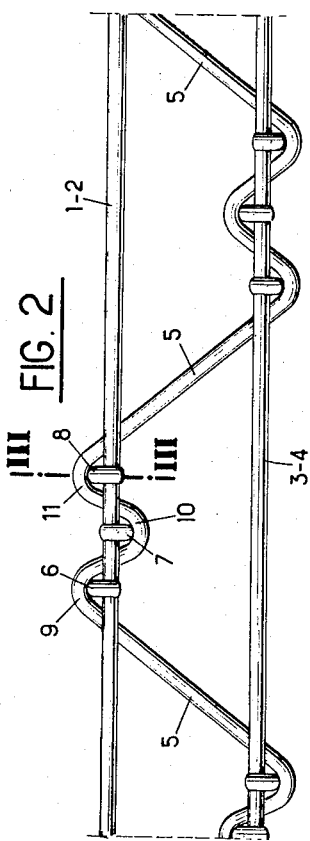
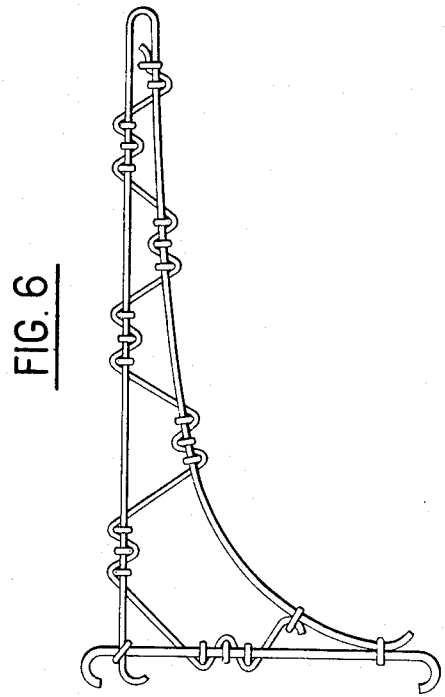
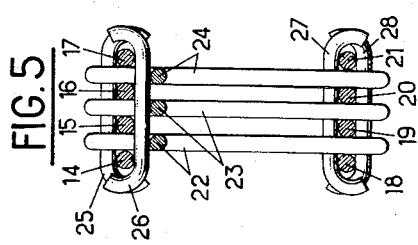
André Veillet
INVENTOR.
BY Clarence A. O'Brien
and Harvey B. Jacobson
Attorneys United States Patent Office 2,997,812
Patented Aug. 29, 1961

2,997,812
REINFORCEMENT FOR FERRO-CONCRETE
André Veillet, 56 Rue de Tocqueville, Paris 17, France
Filed Feb. 17, 1958, Ser. No. 715,827
Claims priority, application France Feb. 18, 1957
2 Claims. (Cl. 50—486)

The making of steel reinforcements constitutes an important step in constructing ferro-concrete buildings. Indeed, such making requires skilled labor and it should be effected under accurate conditions so as to insure the characteristics as determined by computation.

The present trend consists, in order to save time and labor in the building yards, in the use of prefabricated reinforcement elements. Said elements were hitherto often obtained by welding, which results on the one hand in high costs, and on the other hand that there may be some danger in use, since it is always very difficult to control the correct carrying out of a weld.

The present invention has for its object to provide a seamless new and improved reinforcement for ferro-concrete, characterized by the fact that said reinforcement may be realized without seam, such as necessary if welding operations have been carried out, by means of an equipment which is simple and that said reinforcement has a mechanical resistance sufficient to allow for transportation and positioning thereof without distortion, the assembly of the several round irons comprising the reinforcement being effected in a wedging manner by means of new elements acting as keys.

The device according to the invention, which allows for assembling several round irons, comprises three pieces in the form of keys, the extremities of which are bent inwardly. The extremities of said pieces are later bent, so that a tightening action is applied to the different irons to be assembled to produce a firm fastening of the different pieces one to the other.

Reinforcements realized according to the present invention have the advantage of being sufficiently rigid so that it becomes possible to position the whole reinforcement system intended for a building.

Said rigidity is such that it is even possible to clamp the concrete forms to the reinforcements, whereas in conventional devices for practicing reinforced concrete it is on the contrary necessary to clamp reinforcements to said forms, since such reinforcements have by themselves no rigidity.

The reinforcements according to the invention may be easily transported and manipulated without any risk of distortion.

In order that the object of the invention be better understood, there will be now described, as an illustration and without any limitative character, an example of a form thereof, with reference to the annexed drawings, in which:

FIG. 1 shows in perspective the reinforcement of a beam made according to the invention.

FIG. 2 is an elevation view of the beam shown in FIG. 1.

FIG. 3 is a section taken substantially along III—III in FIG. 2.

FIG. 4 corresponds to FIG. 3, the key having been press-worked.

FIG. 5 is a cross section of a beam with four longitudinal reinforcements; and

FIG. 6 shows schematically the reinforcement of a shelf or bracket made according to the invention.

In FIGS. 1, 2, 3 and 4, it may be seen that units consisting of the longitudinal reinforcement bars 1, 2, 3 and 4 of the beam, as well as the transverse reinforcement 5 intended to oppose the shearing forces are provided.

Reinforcement bars 1 and 2 are fastened to transverse reinforcement 5 by means of three pieces 6, 7 and 8 forming keys which engage within bends 9, 10 and 11 formed on piece 5, in such a manner that the bent extremities of the key-forming pieces 6, 7 and 8 are directed towards and are applied and pressed against reinforcement bars 1 and 2. For convenience those portions of the inner surfaces of the bends 9, 10, 11 which are most remote from the longitudinal bars 1—2 are hereinafter referred to as the inner apices of said bends, and the distance between a line drawn through the apices of bends 9 and 11 on one side of bars 1 and 2, and a line drawn through the apex of bend 10 parallel to and on the other side of the longitudinal bars 1 and 2, is referred to as the lateral displacement between these apices, i.e. between the apices of bends 9 and 11 on the one side and the apex of bend 10 on the other side.

An arrangement of the type described in the preceding paragraph is represented by the right-hand part of FIG. 1 at assembling point A. Said assembling is carried out in a sufficient accurate manner, i.e. without important clearance, so that the reinforcement of the beam thus constituted has already a sufficient rigidity.

To lock the assembly thus constituted, a force is applied by means of a press on the key-forming pieces, such as 8, in the direction of arrows 12 and 13 (FIG. 3), so as to bend said piece 8, as shown in FIG. 4, thus causing the whole of the pieces forming the assembling point A to be wedged.

In FIG. 1, only the assembling point B is represented after shaping of the key-forming pieces, as shown in FIG. 4.

FIG. 5 shows in section a beam constructed according to the invention, but comprising four pairs of longitudinal reinforcements 14—15, 16—17, 18—19 and 20—21 which are mutually spaced by bars 22, 23 and 24, the fastening of the assemblies being made by means of key-forming pieces, such as 25, 26, 27 and 28; and said pieces are then press-shaped so as to obtain such wedging as explained with reference to FIGS. 3 and 4.

FIG. 6 shows, as an example, the reinforcement for a shelf or bracket made according to the invention, the several pieces comprising the reinforcement being assembled as described with reference to FIG. 2.

The bent pieces required for making reinforcements according to the invention are obtained without difficulty with the aid of an appropriate templet.

By means of a yard press of a common type, round irons may be cold worked up to a10 mm. diameter.

Since it is possible to assemble said bent irons with longitudinal straight reinforcements the diameter of which may reach up to 20 mm., it can be seen that reinforcements according to the present invention may already be appropriate to elements which should have a great mechanical resistance.

The extremities of the straight reinforcements, such as 1, 2, 3 and 4 (not shown in the drawings), are provided with appropriately shaped hooks to insure perfect adherence thereof to the concrete.

Moreover, said bent hooks allow for assembling the reinforcement parts one with the other according to the present invention.

It is positively to be understood that the particular form of the invention as described above is not in any way limitative and that those skilled in the art may bring thereto any desirable modification without departing from the scope of the invention.

Specifically, it is possible to realize all the types of reinforcements necessary to construct ferro-concrete works, such as pylons, posts, building frameworks, roofing trusses, etc. In particular, reinforcements for posts may be constructed by assembling two beams, such as those represented in FIG. 1, by means of two round bent irons, such as 5.

In order to mount entirely the reinforcements of a ferro-concrete structure, the different parts of the reinforcement may be assembled by means of any device, but it is advisable to use preferably the bent hooks existing at different points of the reinforcements.

Having thus described my invention, what I claim is:

1. A seamless reinforcing member for use in concrete structures comprising at least two pairs of longitudinally extending laterally spaced metallic bars, the bars of each pair being parallel to each other, and said pairs being connected at longitudinally spaced intervals to a transverse bar of zig-zag shape which weaves back and forth between said pairs and is formed into a set of at least three elbow bends at those points at which it is connected to each of said pairs of bars, said elbow bends passing between the individual bars of each pair with one of said bends on the opposite side of said bars from the other bends, and keys between said bends and the adjacent pair of longitudinal bars, the ends of said keys being bent over said longitudinal bars and clamping them to said transverse bar while the central portions of said keys are bowed away from said longitudinal bars, the inner apices of those bends lying on opposite sides of a given pair of longitudinal bars being laterally displaced from each other by a distance approximately equal to the sum of the cross-sectional diameters of two of said keys plus the diameter of one of said longitudinal bars, so that the bowed central portions of said keys bias said oppositely disposed bends in opposite directions away from said longitudinal bars, thereby locking said transverse bars firmly thereto.

2. A seamless reinforcing member as claimed in claim 1 in which said pairs of bars are parallel to each other.

References Cited in the file of this patent

UNITED STATES PATENTS

| | | |
|---|---|---|
| 782,877 | Roney | Feb. 21, 1905 |
| 1,114,147 | Kerr | Oct. 20, 1914 |

FOREIGN PATENTS

| | | |
|---|---|---|
| 271,895 | Italy | 1930 |